No. 805,673. PATENTED NOV. 28, 1905.
G. SCHRAM.
VEHICLE WHEEL.
APPLICATION FILED FEB. 17, 1905.
2 SHEETS—SHEET 2.
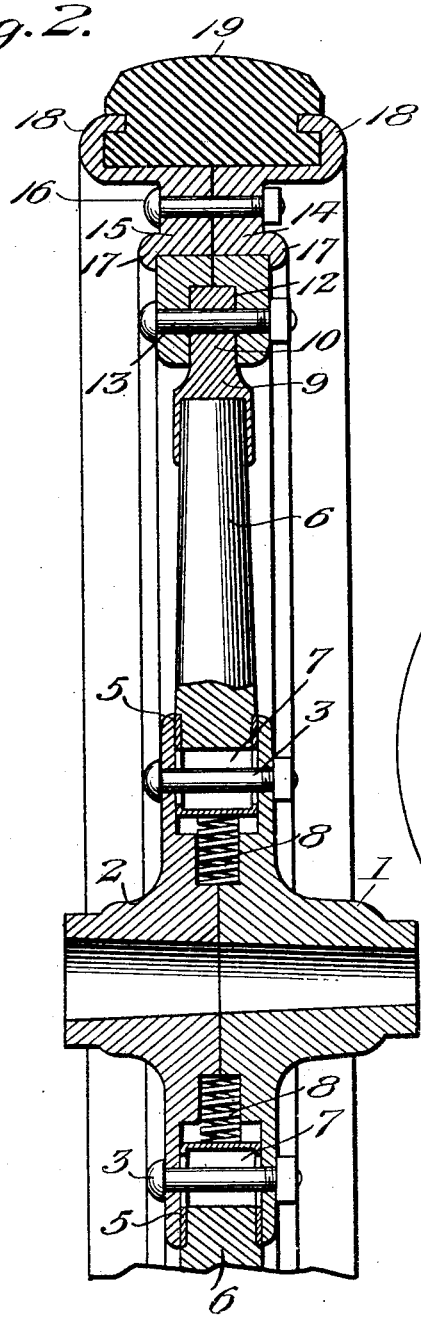
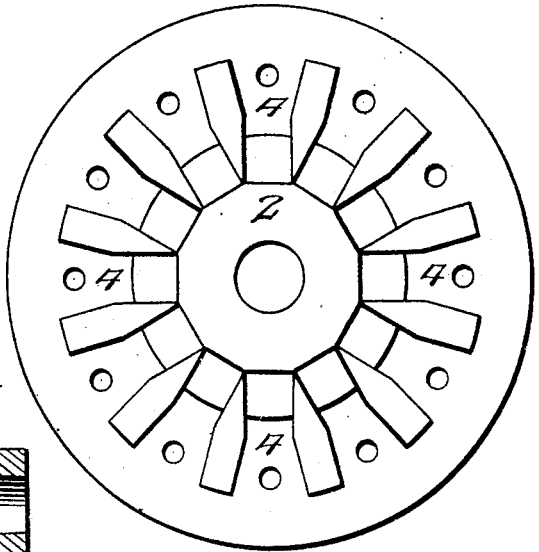
Witnesses
Edwin G. McKee
W. H. Clarke
Inventor
George Schram
By Victor J. Evans
Attorney

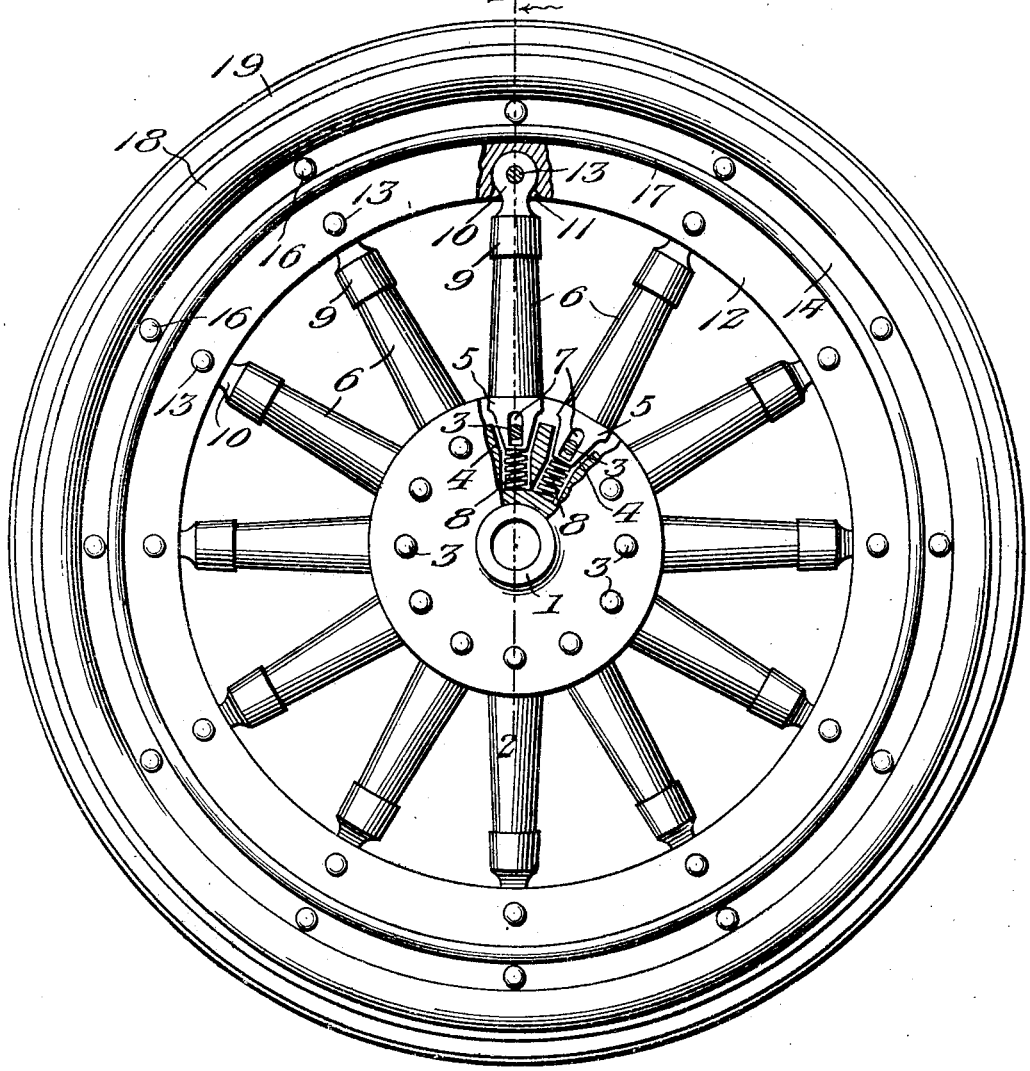

UNITED STATES PATENT OFFICE.

GEORGE SCHRAM, OF DETROIT, MICHIGAN.

VEHICLE-WHEEL.

No. 805,673.      Specification of Letters Patent.      Patented Nov. 28, 1905.

Application filed February 17, 1905. Serial No. 246,143.

*To all whom it may concern:*

Be it known that I, GEORGE SCHRAM, a subject of the King of Great Britain, residing at Detroit, in the county of Wayne and State of Michigan, have invented new and useful Improvements in Vehicle-Wheels, of which the following is a specification.

This invention relates to vehicle-wheels.

The objects of the invention are to improve and strengthen the construction of such devices; furthermore, to increase their efficiency and durability in use.

With the foregoing and other objects in view, which will appear as the description proceeds, the invention resides in the novel combination and arrangement of parts and in the details of construction hereinafter described and claimed as a practical embodiment thereof.

In the accompanying drawings, forming a part of this specification, Figure 1 is a side elevation, partly in section, of a wheel constructed in accordance with the invention. Fig. 2 is a section on the line 2 2 of Fig. 1. Fig. 3 is a detail view showing one-half of the hub.

Like reference-numerals indicate corresponding parts in the several views.

The hub of the improved wheel is formed, preferably, in two parts 1 and 2, which are secured together by means of bolts 3. The hub is formed with a plurality of sockets having flared outer ends into which are fitted wedge-shaped metallic casings 5, secured to the inner ends of wooden spokes 6. The wedge-shaped casings 5 are formed with slots 7, through which extend the bolts 3. Disposed in each of the sockets 4 beneath the adjacent casing 5 is a coil-spring 8.

Secured to the outer end of each spoke 6 is a metallic cap 9, having a rounded end 10, which is fitted into a flared socket 11, formed in a supplemental rim 12. The supplemental rim 12 is constructed in two parts, which are connected with each other by means of bolts 13. Each of the bolts 13 extends through the rounded head 10 of one of the caps 9.

Secured to the supplemental rim 12 is a pair of clamping members 14 15, which are connected together by bolts 16. Each of the clamping members 14 and 15 is formed with a flange 17, which engages one side of the supplemental rim 12. At their outer peripheries the clamping members 14 and 15 are formed with flanges 18, which fit into grooves formed in the side edges of a solid tire 19.

The improved wheel of this invention is adapted to be employed in connection with automobiles and similar vehicles. By means of its peculiar construction the necessity of employing a pneumatic tire is avoided.

The arrangement of the spokes in the sockets of the hub, together with the use of the coil-springs 8, serves to distribute the strain falling upon the rim of the wheel and to prolong the life thereof.

Changes in the precise embodiment of invention illustrated and described may be made within the scope of the following claims without departing from the spirit of the invention or sacrificing any of its advantages.

Having thus described the invention, what is claimed as new is—

1. A wheel comprising a hub, spokes yieldingly connected with the hub, a supplemental rim separated longitudinally into a plurality of parts and connected with said spokes, clamping members engaging opposite sides of the supplemental rim, and a tire held between the clamping members.

2. A wheel having a hub formed with flared sockets, a coil-spring and a wedge-shaped casing in each of said sockets, a spoke connected with each of said casings, and a tire supported by said spokes.

3. A wheel having a hub constructed in two parts and having sockets, a coil-spring in each of said sockets, a slotted casing in each of said sockets, a bolt extending through the slots of each casing and serving to connect the two parts of the hub, a spoke connected with each of the casings, a cap on the outer end of each spoke, a supplemental rim having a plurality of sockets to receive the caps of the spokes, said rim being divided longitudinally into two parts, bolts connecting the two parts of the rim and extending through the rounded heads of the caps, clamping members having flanges engaging the opposite sides of the supplemental rim, and a solid tire held between the clamping members.

In testimony whereof I affix my signature in presence of two witnesses.

GEORGE SCHRAM.

Witnesses:
     JAMES T. HENDERSON,
     TASKER J. HENDERSON.